(12) United States Patent
Ueda et al.

(10) Patent No.: US 6,449,981 B1
(45) Date of Patent: Sep. 17, 2002

(54) AIR PASSAGE CONTROLLING SYSTEM FOR AIR CONDITIONING APPARATUS

(75) Inventors: Hisashi Ueda, Kariya; Katsuyuki Ohsaki, Chiryu; Keizo Goto, Kariya, all of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/067,765

(22) Filed: Apr. 29, 1998

(51) Int. Cl.$^7$ .................................................. B60S 1/54
(52) U.S. Cl. ........................ 62/612; 454/156; 137/351; 251/145
(58) Field of Search ........................ 454/121, 69, 143, 454/156, 159, 160; 137/351; 251/145

(56) References Cited

U.S. PATENT DOCUMENTS

| | | | |
|---|---|---|---|
| 4,513,808 A | * | 4/1985 | Ito et al. ..................... 165/43 |
| 5,160,115 A | * | 11/1992 | Ito et al. ................. 251/129.12 |
| 5,706,667 A | * | 1/1998 | Iritani et al. .................. 62/230 |

FOREIGN PATENT DOCUMENTS

JP          A-6-74548        3/1994

* cited by examiner

Primary Examiner—Harold Joyce
Assistant Examiner—Derek S. Boles
(74) Attorney, Agent, or Firm—Harness, Dickey & Pierce, PLC

(57) ABSTRACT

An air passage controlling system for selecting an air outlet mode of an air conditioning apparatus includes a driving shaft, an intermediate shaft, a driven shaft and a film door disposed between the shafts. The film door has a door opening through which air flows, and is disposed inside an air duct to be opposite to a duct opening of the air duct. The duct opening is opened and closed by moving the film door to select an air outlet mode. The driving shaft and the driven shaft are respectively connected to a driving pulley and a driven pulley which are linked via a wire. The driving shaft is rotated by a DC motor, and a rotation angle of the driving shaft is detected by a multi-rotation type potentiometer. The DC motor is controlled by an ECU according to the detected rotation angle of the driving shaft so that the film door is moved to a set position. Thus, due to the potentiometer, a low-priced DC motor is employed for the air passage controlling system instead of a high-priced step motor, resulting in cost reduction of the system.

14 Claims, 7 Drawing Sheets

FACE MODE

BILEVEL MODE

FOOT MODE

FOOT/DEFROSTER MODE

DEFROSTER MODE

AIR PASSAGE CONTROLLING SYSTEM FOR AIR CONDITIONING APPARATUS

CROSS REFERENCE TO RELATED APPLICATION

This application relates to and incorporates herein by reference Japanese Patent Application No. 7-283010 filed on Oct. 31, 1995.

BACKGROUND OF THE INVENTION

1. Field of the Invention

The present invention relates to an air passage controlling system for opening and closing an air passage and for adjusting an amount of air flowing through the air passage by moving a film door. The air passage controlling system is used for selecting an air outlet mode of an air conditioning apparatus, and is used for mixing air in the air conditioning apparatus.

2. Related Art

In a conventional air conditioning apparatus for a vehicle, air introduced from a blower unit passes through an evaporator or a heater core disposed in an air duct, and is blown toward a passenger compartment from air outlets in the passenger compartment through each opening formed on the air duct. To simplify a control for opening and closing each opening of the air duct, an air passage controlling system having a film door is described in JP-A-6-74548.

In the air passage controlling system, as shown in FIG. 10, a film door 1 has a plurality of film openings 1a, and is moved in a longitudinal direction of the film door 1. One end of the film door 1 is wound around a driving shaft 2, and the other end thereof is wound around a driven shaft 3. The film door 1 is disposed to move along an air duct 4 having a plurality of openings 5 (partially shown in FIG. 10). The driving shaft 2 is rotated by a step motor 6 controlled according to pulse signals sent from a microcomputer. When the driving shaft 2 is rotated, the film door 1 is moved by or wound around the driving shaft 2 so that the film openings 1a of the film door 1 are stopped at a predetermined position on the air duct 4.

In this system, however, because the step motor 6 is expensive, a price of the system tends to be high, although the system has an excellent accuracy in stoppage. Further, because the system does not have a position detector for detecting a position of the film door 1, an initialization operation for returning the film door 1 to an original position is performed whenever the system is used.

To solve the above-mentioned problem, a servomotor including a potentiometer may be used instead of the step motor 6. However, because the maximum detectable rotation angle for the servomotor is approximately 180° while the driving shaft 2 rotates at over 360° (e.g., three rotations), a reduction intermediate gear is required between the driving shaft 2 and the servomotor. This results in increase of a size and a cost of the air passage controlling system.

SUMMARY OF THE INVENTION

In view of the foregoing problems, it is an object of the present invention to provide an air passage controlling system which opens and closes an air passage and adjusts an amount of air flowing through the air passage by moving a film door at a predetermined position, without increasing production cost.

According to the present invention, an air passage controlling system includes a film member having a film opening, first and second shafts for moving the film member therebetween, an electric motor for rotating the first shaft member, and a potentiometer, rotatable in multiple, for detecting a rotation angle of the first shaft. The electric motor is controlled by a controlling unit according to a rotation angle of the first shaft, detected by the potentiometer. Because the potentiometer can detect the rotation angle of the first shaft even if the rotation angle of the first shaft is more than 360°, an exact position of the film member can be directly detected by the potentiometer so that the film member is moved at a pre-set position. Thus, a low-priced DC motor can be employed for the air passage controlling system instead of a high-priced step motor, resulting in cost reduction of the air passage controlling system.

Preferably, the potentiometer is attached to the first shaft at a side opposite to a side of the electric motor in an axial direction of the first shaft. Alternatively, the electric motor is attached to the first shaft, and the potentiometer is attached to the second shaft. Thus, the potentiometer can be readily provided in a limited small space to reduce the size of the air passage controlling system.

BRIEF DESCRIPTION OF THE DRAWINGS

These and other objects and features of the present invention will become more readily apparent from a better understanding of the preferred embodiment described below with reference to the accompanying drawings, in which.

DETAILED DESCRIPTION OF THE PREFERRED EMBODIMENT

A preferred embodiment of the present invention will be described hereinafter with reference to FIGS. 1–9. In the embodiment, an air passage controlling system is applied to an air conditioning apparatus 11 for a vehicle. That is, the air passage control system is applied to an air outlet mode selecting damper 20 for selecting an air outlet mode of the air conditioning apparatus, and is applied to an air mixing damper 16 for controlling a flow rate of air passing through a heater core in the air conditioning apparatus 11.

Figure 2:
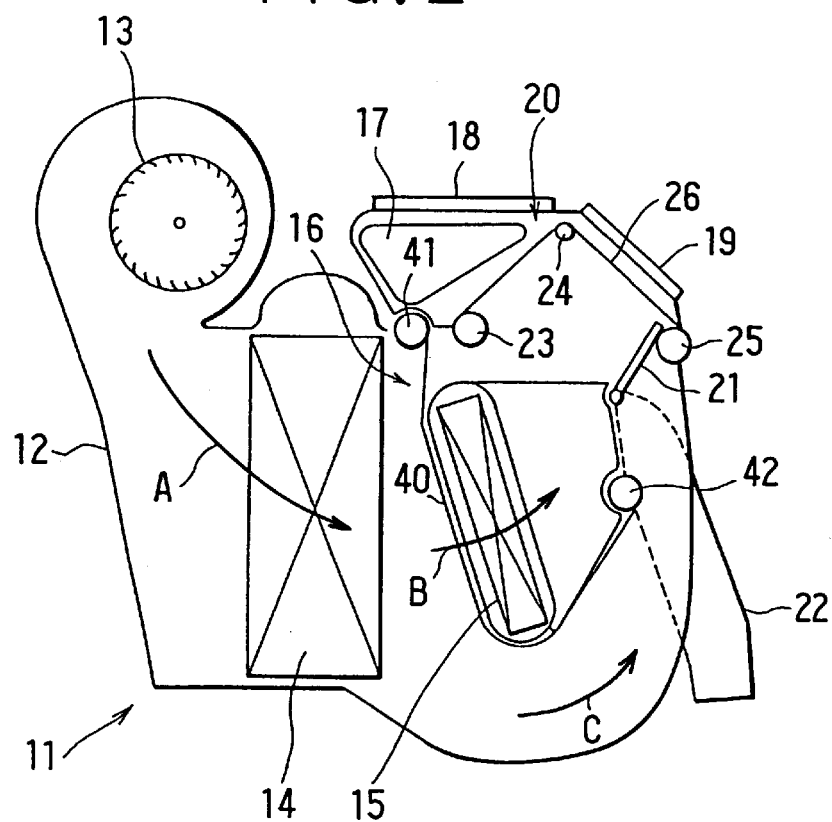
FIG. 2 is a schematic cross-sectional view showing an air conditioning apparatus according to the embodiment.

As shown in FIG. 2, the air conditioning apparatus 11 has an air duct 12 for forming an air passage. The air duct 12 accommodates a blower unit 13 at an upper left part in FIG. 2. When the blower unit 13 operates, air is introduced into the air duct 12 through an air intake duct (not shown) and flows through the air duct 12. The air duct 12 also accommodates an evaporator 14 for cooling air passing therethrough, and refrigerant in a refrigerant cycle (not shown) is supplied to the evaporator 14. Air blown by the blower unit 13 passes through the evaporator 14 and flows toward a right side in FIG. 2 (i.e., a direction indicated by arrow A).

The air duct 12 also accommodates a heater core 15 at a right side (i.e., downstream air side) of the evaporator 14 in FIG. 2. The heater core 15 heats air passing therethrough using engine cooling water (hot water) as a heating source. The air mixing damper 16 for adjusting a flow rate (amount) of air passing through the heater core 15 is disposed in the air duct 12. The air mixing damper 16 is used as an air passage controlling system in the embodiment, and adjusts an amount of air passing through the heater core 15 and an amount of air bypassing the heater core 15 according to a set air temperature in the passenger compartment. In FIG. 2, warm air passing through the heater core 40 is indicated by arrow B, and cool air bypassing the heater core 40 is indicated by arrow C.

In this embodiment, the air duct 12 has a foot duct opening 17, a defroster duct opening 18 and a face duct opening 19 at an upper right portion in FIG. 2. The foot duct opening 17, the defroster duct opening 18 and the face duct opening 19 are respectively communicated with a foot air outlet (not shown), a defroster air outlet (not shown) and a face air outlet (not shown), which are respectively provided in the passenger compartment. An air outlet mode selecting damper 20 is disposed inside the air duct 12 to open and close the foot duct opening 17, the defroster duct opening 18 and the face duct opening 19 to select an air outlet mode.

Accordingly, when the blower unit 13 is driven, outside air (i.e., air outside the passenger compartment) or inside air (i.e., air inside the passenger compartment) is introduced into the air duct 12 and flows through the air duct 12 as shown by arrows A, B, C to adjust the temperature to be blown into the passenger compartment. Then, air conditioned to have a desired temperature is blown toward the passenger compartment from a designated air outlet through the foot, defroster or face air duct openings 17, 18 or 19. A cool air bypass damper 21 for opening and closing a cool air bypass passage is disposed in the air duct 12, and fully opens the cool air bypass passage in the maximum cooling mode. Further, the air duct 12 is connected to a rear foot duct 22 so that a part conditioned air can be blown toward a rear seat side in the passenger compartment.

The air outlet mode selecting damper 20 will be described with reference to FIGS. 1, 3A–3E and 4. The air outlet mode selecting damper 20 is also used as an air passage controlling system. The air outlet mode selecting damper 20 includes a driving shaft 23, an intermediate shaft 24 and a driven shaft 25 which are rotatably held in the air duct 12, and a film door 26 disposed to move between the shafts 23–25. The driving shaft 23, the intermediate shaft 24 and the driven shaft 25 are disposed to form a triangle shaped section, and the film door 26 is disposed to be opposite to the foot, defroster and face duct openings 17, 18, 19.

The film door 26 is made of plastic film reinforced by cloth attached to one side of the film, and is elongated in a lateral direction (left-right direction) in FIGS. 3A–3E. As shown in FIGS. 3A–3E, the film door 26 has a plurality of foot film openings 26a, defroster film openings 26b and face film openings 26c, which respectively correspond to the foot duct opening 17, the defroster duct opening 18 and the face duct opening 19.

One end (i.e., a left end in FIGS. 3A–3E) of the film door 26 is attached to and wound around the driving shaft 23 outwardly, and the other end (i.e., a right end in FIG. 3A–3E) of the film door 26 is also attached to and wound around the driven shaft 25 outwardly. The film door 26 are disposed to extend between the driving shaft 23, the intermediate shaft 24 and the driven shaft 25 to have a tension, while bending at the intermediate shaft 24. Therefore, the film door 26 extending between the driving shaft 23 and the intermediate shaft 24 can open and air-tightly close the foot duct opening 17 and the defroster duct opening 18, and the film door 26 extending between the intermediate shaft 24 and the driven shaft 25 can open and air-tightly close the face duct opening 19.

Figure 1:
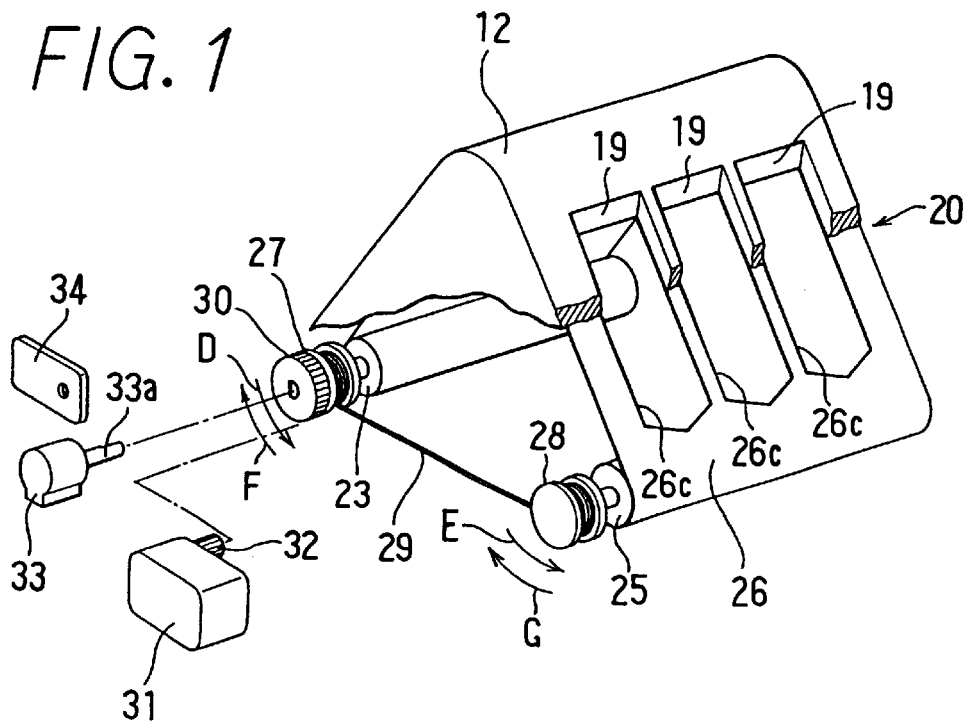
FIG. 1 is a perspective view showing an air passage controlling system applied to an air outlet mode selecting damper according to a preferred embodiment of the present invention.

As shown in FIG. 1, a driving pulley 27 is attached to a longitudinal end of the driving shaft 23, and a driven pulley 28 is attached to a longitudinal end of the driven shaft 25. The driving pulley 27 and the driven pulley 28 are linked via a wire 29. The wire 29 is wound around the driving pulley 27 and the driven pulley 28 in a direction opposite to a winding direction of the film door 26. A length of the wire 29 is determined so that winding numbers of the wire 29 around the driving pulley 27 and the driven pulley 28 are respectively more than each winding number of the film door 26 around the driving shaft 23 and the driven shaft 25.

When the driving shaft 23 rotates in a direction of arrow D in FIG. 1 so that the film door 26 is wound around the driving shaft 23, the wire 29 unwound from the driving pulley 27. At this time, the driven shaft 25 rotates in a direction of arrow E so that the film door 26 is unwound from the driven shaft 25, and the wire 29 is wound around the driven pulley 28. On the other hand, when the driving shaft 23 rotates. in a direction of arrow F so that the film door 26 is unwound from the driving shaft 23, the wire 29 is wound around the driving pulley 27, the driven pulley 28 rotates in a direction of arrow G, and the film door 26 is wound around the driven shaft 25 and the wire 29 is unwound from the driven pulley 28. The driven shaft 25 and the driven pulley 28 are connected via a tensioner (not shown); and therefore, the film door 26 is kept under tension.

Further, the driving pulley 27 has a gear 30 formed integrally. The gear 30 is engaged with a gear 32 attached to an output shaft of a direct-current motor (hereinafter referred to as "DC motor") 31. Therefore, when the DC motor rotates forwardly, the driving shaft 23 is rotated in the direction of arrow D so that the film door 26 is wound around the driving shaft 23. On the other hand, when the DC motor rotates in a reverse direction, the driving shaft 23 is rotated in the direction of arrow F so that the film door 26 is unwound from the driving shaft 23.

Figure 3A:
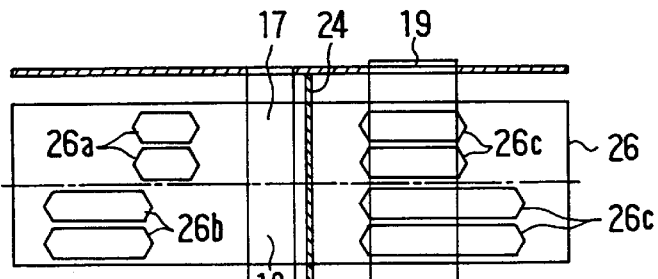
FIGS. 3A–3E are plan views respectively showing the position relationship between openings of an air duct and a film door in a face mode, a bi-level mode, a foot mode, a foot/defroster and a defroster mode according to the embodiment.
Figure 3B:
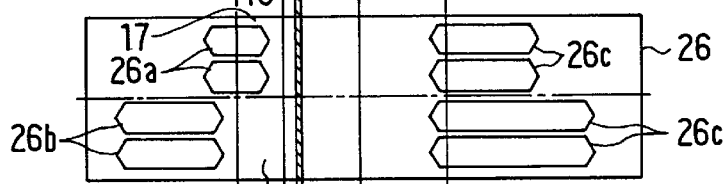
Figure 3C:
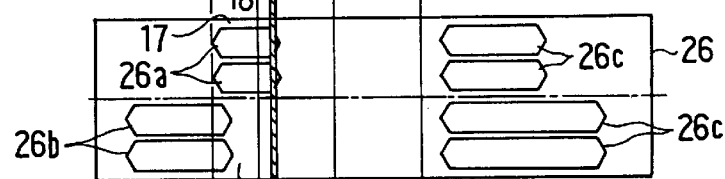
Figure 3D:
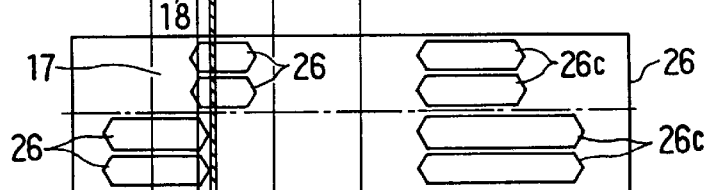
Figure 3E:
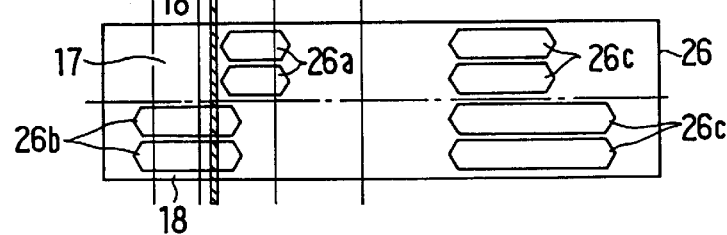

In this embodiment, a predetermined air outlet mode is selected from five air outlet modes by moving the film door 26 using the driving shaft 23. For example, when a face mode is selected as shown in FIG. 3A, the foot duct opening 17 and the defroster duct opening 18 are closed by film portions of the film door 26, and the face duct opening 18 is opened by the face film openings 26c of the film door 26. In this case, air within the air duct 12 is blown toward an upper side in the passenger compartment through the face air outlet. When a bilevel mode is selected as shown in FIG. 3B, the defroster duct opening 18 is closed by film portions of the film door 26, and the foot film openings 26a and the face film openings 26c are partly opened by the foot duct opening 17 and the face duct opening 19 of the film door 26, respectively. In this case, air within the air duct 12 is blown toward both upper and lower sides in the passenger compartment through the face air outlet and the foot air outlet. When a foot mode is selected as shown in FIG. 3C, the defroster duct opening 18 and the face duct opening 19 are closed by the film portions of the film door 26, and the foot film openings 26a are opened by the foot duct opening 17 of the film door 26. In this case, air within the air duct 12 is blown toward the lower side in the passenger compartment through the foot air outlet. When a foot/defroster mode is selected as shown in FIG. 3D, the face duct opening 19 is closed by the film portions of the film door 26, and the foot film openings 26a and the defroster film openings 26b are partly opened by the foot duct opening 17 and the defroster duct opening 18 of the film door 26, respectively. In this case, air within the air duct 12 is blown toward both of the lower side in the passenger compartment and an inner surface of a windshield through the foot air outlet and the defroster air outlet. When a defroster mode is selected as shown in FIG. 3E, the foot duct opening 17 and the face duct opening 19 are closed by the film portions of the film door 26, and the defroster film openings 26b are opened by the defroster duct opening 18 of the film door 26. In this case, air within the air duct 12 is blown toward the inner surface of the windshield through the defroster air outlet.

As shown in FIG. 1, the driving shaft 23 is connected to a rotation shaft 33a of a well-known multi-rotation type potentiometer 33. The multi-rotation type potentiometer 33 is rotatable in multiple according to the rotation of the driving shaft 23. That is, the potentiometer 33 can be rotated with a rotation angle more than 360° to directly detect the rotation angle of the driving shaft 23. The potentiometer 33 is attached to the air duct 12 via an attachment bracket 34. Therefore, the potentiometer 33 can detect a rotation angle of the driving shaft 23.

As shown in FIGS. 3A–3E, the driving shaft 23 rotates with a rotation angle range of 0° to 850° (i.e., approximately two and a half rotation) while switching between the five air outlet modes by moving the film door 26. Because the potentiometer 33 can detect a rotation angle more than 360°, an absolute rotation angle of the driving shaft 23 which indicates an exact position of the film door 26 can be detected by using the potentiometer 33.

Figure 4:
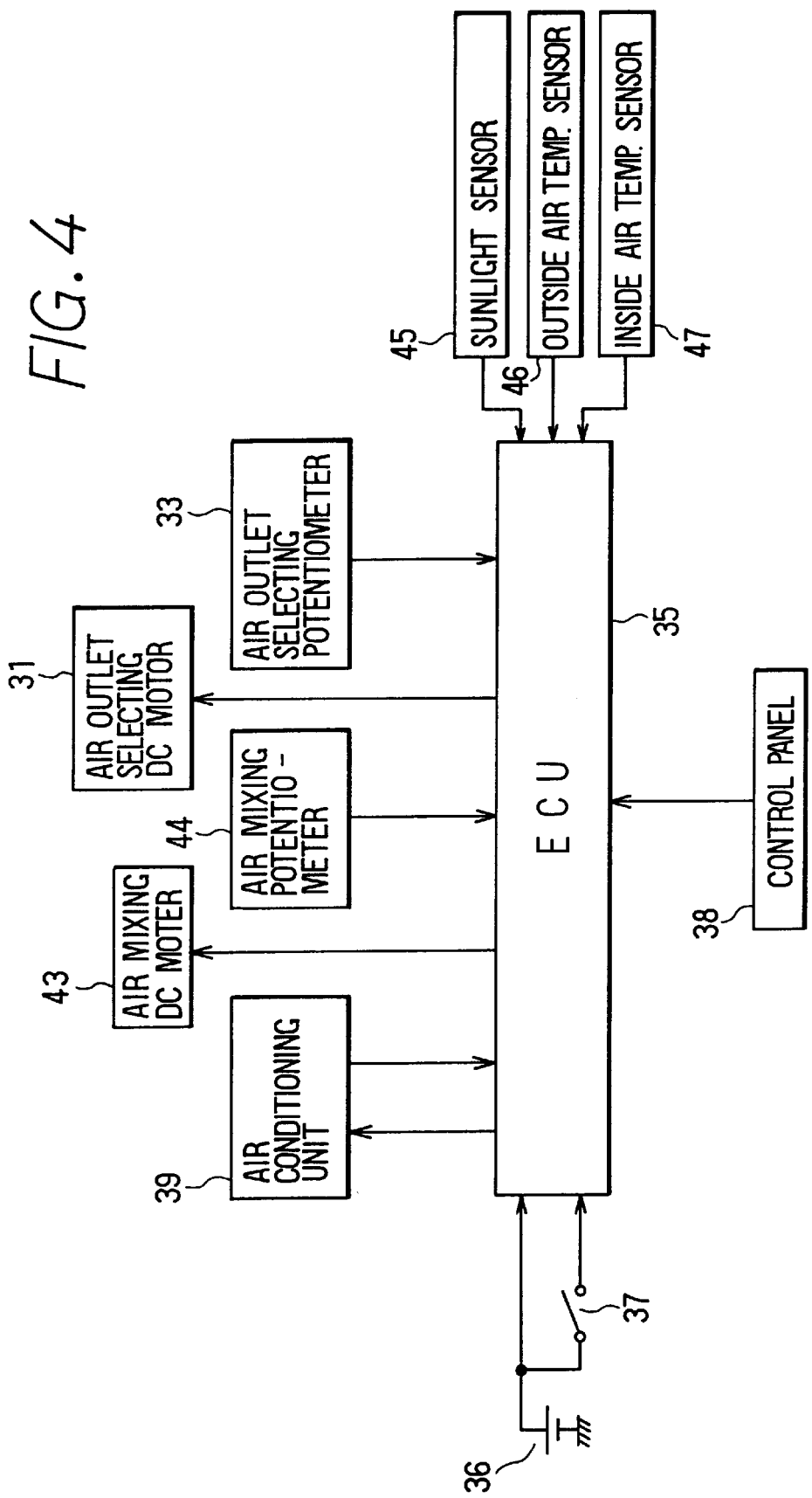
FIG. 4 is a block diagram showing an electronic control unit of the air conditioning apparatus according to the embodiment.

As shown in FIG. 4, an electronic controlling unit (hereinafter referred to as "ECU") 35 is powered by a battery 36, and receives ON/OFF signals from an ignition switch 37. The ECU 35 also receives signals sent from a control panel 38 provided in the passenger compartment. The control panel 38 has various switches including an air outlet mode selecting switch (not shown), an air temperature setting switch (not shown). The ECU 35 controls an air conditioning unit 39 which consists of the various devices such as refrigerant cycle, an engine cooling water circulating unit.

The ECU 35 receives a detection signal from the potentiometer 33 and controls the DC motor 31 electrically. More specifically, when the ECU 35 receives an air outlet mode set signal from the control panel 38, the ECU 35 electrically controls the DC motor 31 according to the detection signal from the potentiometer 33 to move the film door 26 at a predetermined position, following a control program.

Figure 6A:
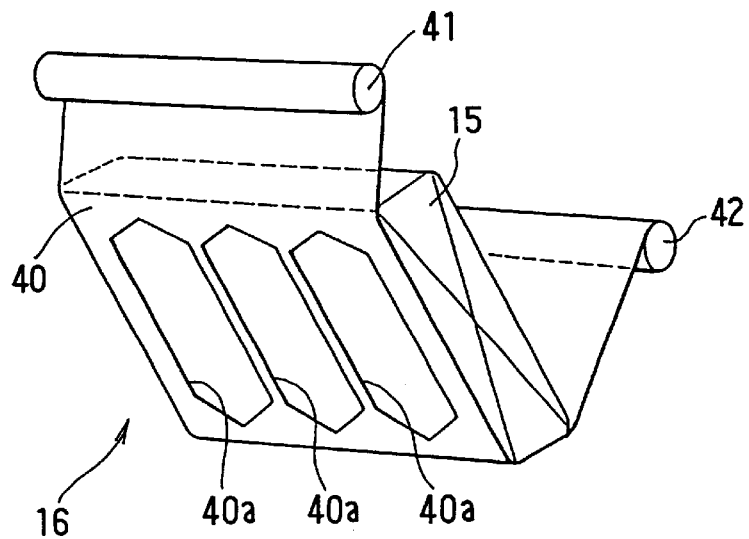
FIGS. 6A and 6B are perspective views showing a part of an air passage controlling system applied to an air mixing damper according to the embodiment.
Figure 6B:
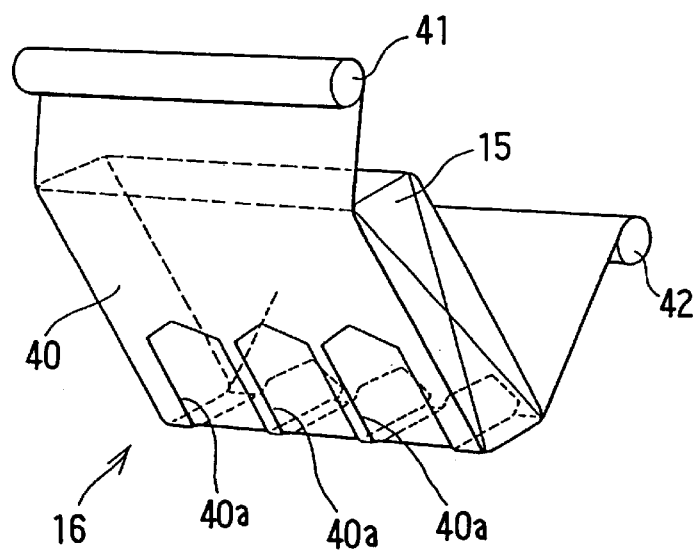
Figure 7:
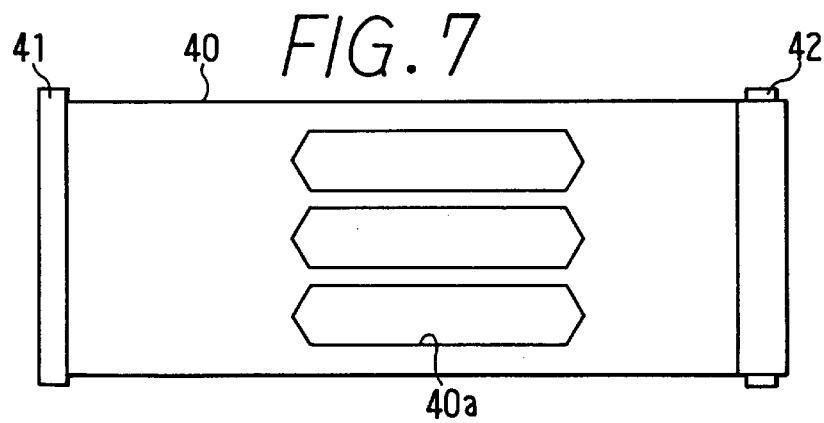
FIG. 7 is a plan view showing a film door of the air mixing damper according to the embodiment.

Next, the air mixing damper 26 is described with reference to FIGS. 6A, 6B, 7. The heater core 15 has a heater case having a plurality of case openings formed on almost all of a front side surface (i.e., a left side surface in FIG. 2) of the heater case. A film door 40 is disposed to contact the front side surface of the heater case of the heater core 15 to cover the case openings. The film door 40 has a plurality of film openings 40a, and is formed in a rectangular shape elongated in a lateral direction in FIG. 7.

Similarly to the air outlet mode selecting damper 20, one end of the film door 40 is wound and secured on a driving shaft 41, and the other end of the film door 40 is wound and secured on a driven shaft 42 to move the film door 40 along the front side surface of the heater case of the heater core 15 under tension. The driving shaft 41 and the driven shaft 42 are respectively connected to corresponding pulleys (not shown) which are linked via a wire.

The driving shaft 41 is rotated by an air mixing DC motor 43 (shown only in FIG. 4) and a rotation angle of the driving shaft 41 is detected by an air mixing potentiometer 44 (shown only in FIG. 4). When the air mixing DC motor 43 rotates backward and forward, the film door 40 is moved by the driving shaft 41 and the driven shaft 42 to displace the film openings 40a. Therefore, a ratio between an amount of air passing through the heater core 15 and an amount of air bypassing the heater core 15 is adjusted. Thus, a temperature of air blown toward the passenger compartment can be arbitrarily controlled by adjusting the ratio between an amount of air passing through the heater core 15 and an amount of air bypassing the heater core 15.

The air mixing DC motor 43 is electrically controlled by the ECU 35, as shown in FIG. 4. In the embodiment, the amount of air passing through the heater core 15 is controlled by the ECU 35 according to the temperature setting signal sent from the control panel 38, and detection signals sent from a sunlight sensor 45, an outside air temperature sensor 46 and an inside air temperature sensor 47. The ECU 35 electrically controls the air mixing DC motor 43 according to a detection signal sent from the air mixing potentiometer 44 so that the driving shaft 41 is stopped at a rotation angle corresponding to a set amount of air passing through the heater core 15.

The control process of the air outlet mode selecting damper 20 and the air mixing damper 16 will be now described with reference to FIGS. 5 and 8. The air outlet mode selecting damper 20 is operated according to the process of the ECU 35 shown in FIG. 5. When a passenger (e.g., driver) sets the air outlet mode setting switch to an air outlet mode, a rotation angle P of the driving shaft 23 is set according to an air outlet mode set at step S1.

That is, when the face mode is selected, the rotation angle P is set to 850° at step S1. When the bi-level mode is selected, the rotation angle P is set to 750° at step S1. When the foot mode is selected, the rotation angle P is set to 400° at step S1. When the foot/defroster mode is selected, the rotation angle P is set to 200° at step S1. Further, when the defroster mode is selected, the rotation angle P is set to 0° at Step S1.

At step S2, a present rotation angle of the driving shaft 23 detected by the potentiometer 33 is compared with the rotation angle P set at step S1. When the rotation angle P is larger than the present rotation angle (i.e., YES at step S2), the DC motor 31 is turned ON and rotated in a forward direction at step S3. Therefore, the driving shaft 23 is rotated in the direction of arrow D in FIG. 1, and the film door 26 is wound around the driving shaft 23 to move in a left side in FIGS. 3A–3E. While the driving shaft 23 rotates, the potentiometer 33 always detects a present rotation angle of the driving shaft 23 at step S4. That is, at step S4, it is detected that a present rotation angle of the driving shaft 23 reaches the rotation angle P by the potentiometer 33. When the detected rotation angle of the driving shaft 23 has reached the set rotation angle P, the DC motor 31 is turned OFF and stops rotation at step S5.

When the rotation angle P is smaller than a present rotation angle of the driving shaft 23 at step S2, the DC motor 31 is turned ON with a polarity opposite to that at step S3 and rotated in a reverse direction. Therefore, the driving shaft 23 is rotated in the direction of arrow F in FIG. 1. Thus, the film door 26 is unwound from the driving shaft 23 and is wound around the driven shaft 25 to move in a right direction in FIG. 3. The DC motor 31 keeps rotating in,the reverse direction until the present rotation angle of the driving shaft 23 reaches the set rotation angle P. When the present rotation angle of the 25 driving shaft 23 has reached the set rotation angle P at step S7, the DC motor 31 is turned OFF and stops rotation at step S5.

Thus, the film door 26 is moved at a predetermined position according to the selected air outlet mode. Because of a sliding resistance of the film door 26, the driving shaft 23 is immediately accurately stopped at the set rotation angle P without causing any inert rotation when the DC motor 31 stops.

Figure 8:
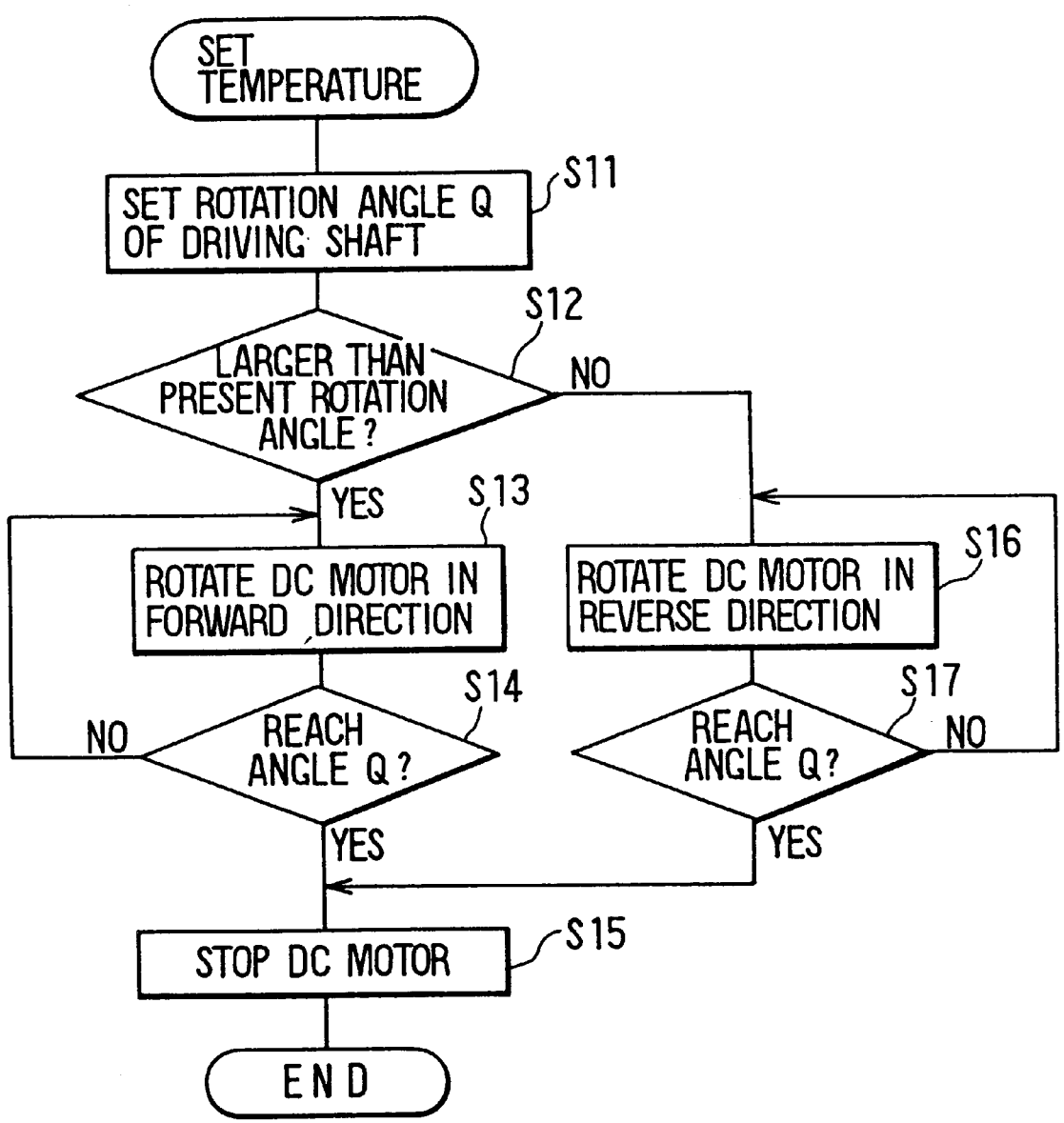
FIG. 8 is a flowchart showing an air amount control process of the air mixing damper according to the embodiment.

The air mixing damper 16 is operated according to the process of the ECU 35 shown in FIG. 8. First, an opening degree of the case openings of the heater core 15 is determined according to an air temperature setting signal from the control panel 38, and detection signals from the sunlight sensor 45, the outside air temperature sensor 46 and the inside air temperature sensor 47. That is, at step S11, a rotation angle Q of the driving shaft 43 is set according to the opening degree of the case openings of the heater core 15.

Figure 5:
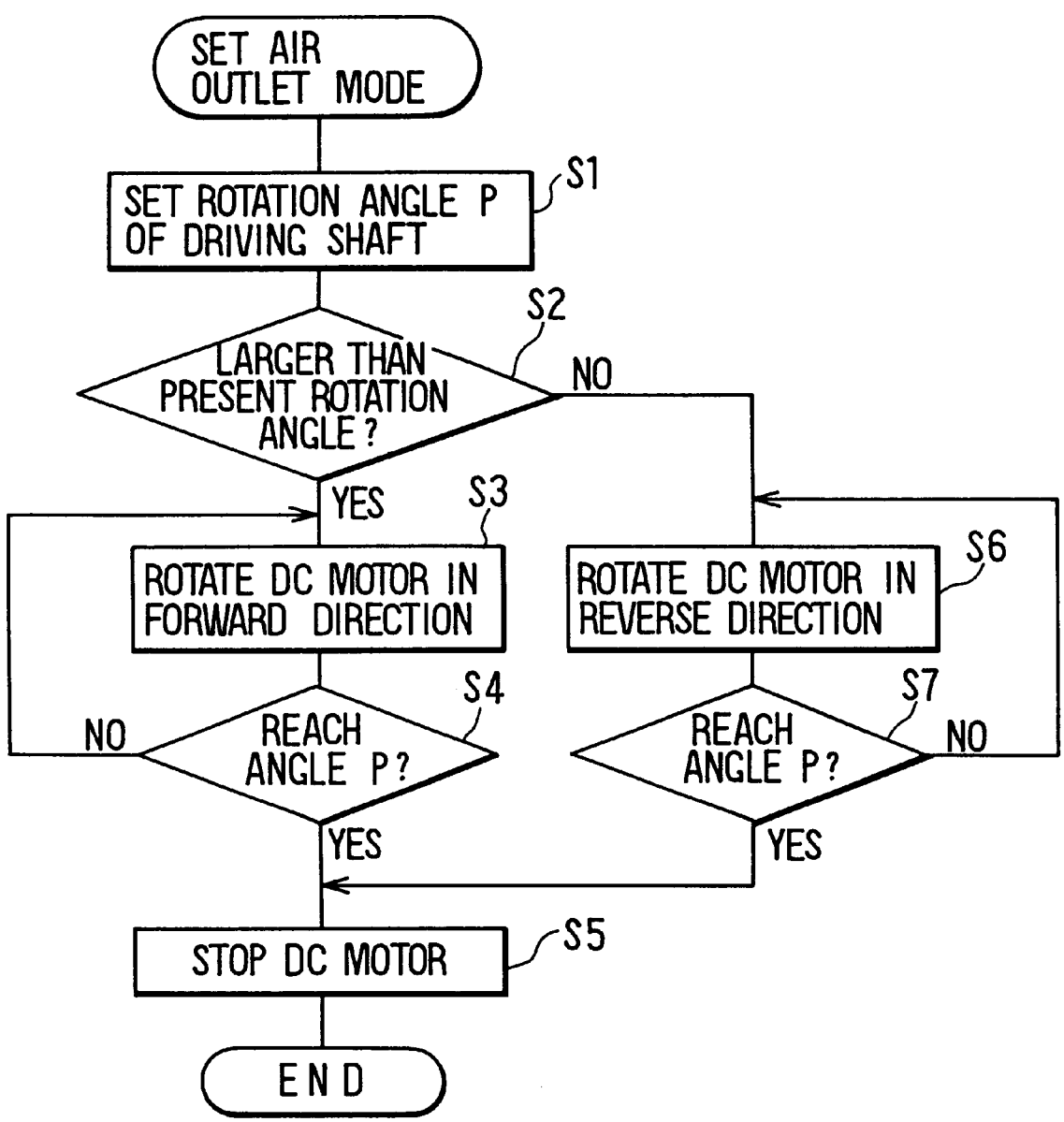
FIG. 5 is a flowchart showing a control process of the air outlet mode selecting damper according to the embodiment.

Next, similarly to the control process in FIG. 5, a present rotation angle of the driving shaft 41, detected by the potentiometer, is compared with the rotation angle Q at step S12. When the present rotation angle is different from the set rotation angle Q at step S12, the DC motor 43 is turned ON and rotated in a forward or a reverse direction at step S13 or S16. When the present rotation angle has reached the set rotation angle Q, the DC motor 43 is turned OFF at step S15. Thus, the film door 40 is moved to be stopped at a predetermined position corresponding to the set temperature of air blown toward the passenger compartment.

In the embodiment, because the air outlet mode selecting damper 20 is provided with the potentiometer 33, a rotation angle of the driving shaft 23 is accurately detected using the DC motor 31 to accurately detect the position of the film door 26. Therefore, a low-priced DC motor 31 can be employed instead of a high-priced step motor 6 or a potentiometer-integrated servomotor which requires a reduction intermediate gear. Thus, the air outlet mode selecting damper 20 having the DC motor 31 can be manufactured in low cost. Further, because the air mixing damper 16 is provided with the potentiometer 44, a rotation angle of the driving shaft 41 is accurately detected using the DC motor 43 to accurately detect the position of the film door 40. Thus, the air mixing damper 16 having the DC motor 43 is also manufactured in low cost.

Although the present invention has been fully described in connection with preferred embodiment thereof with reference to the accompanying drawings, it is to be noted that various changes and modifications will become apparent to those skilled in the art.

Figure 9:
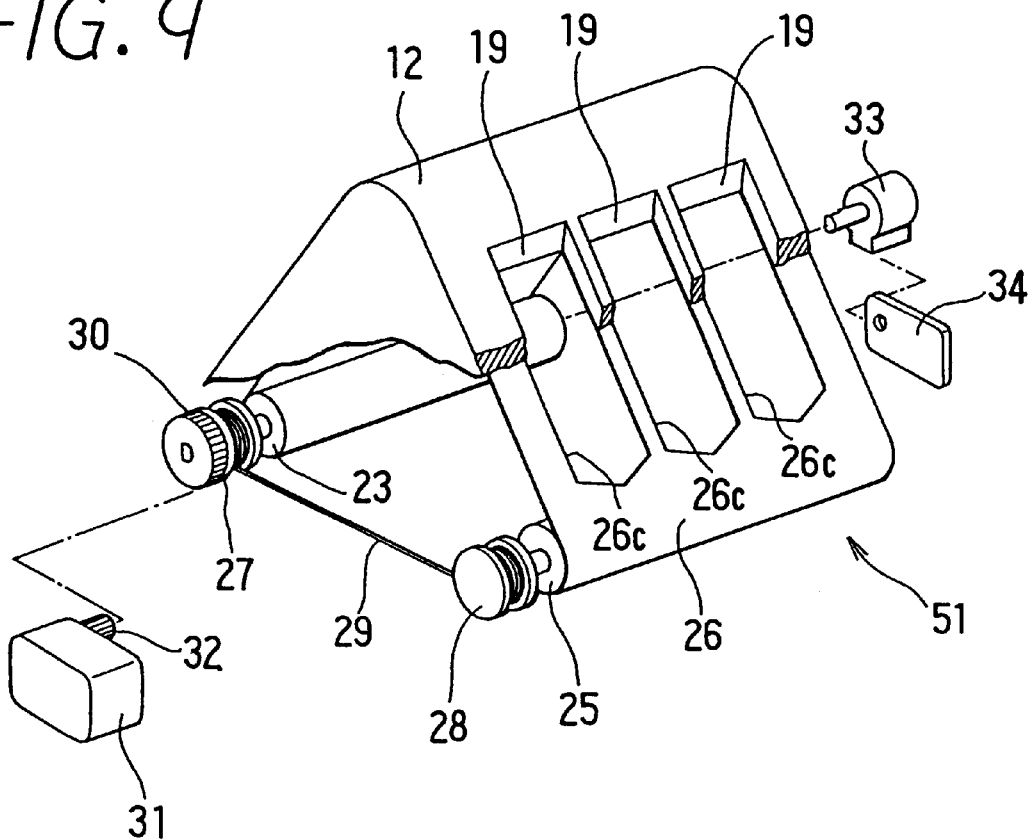
FIG. 9 is a perspective view showing an air passage control system according to a modification of the embodiment.
Figure 10:
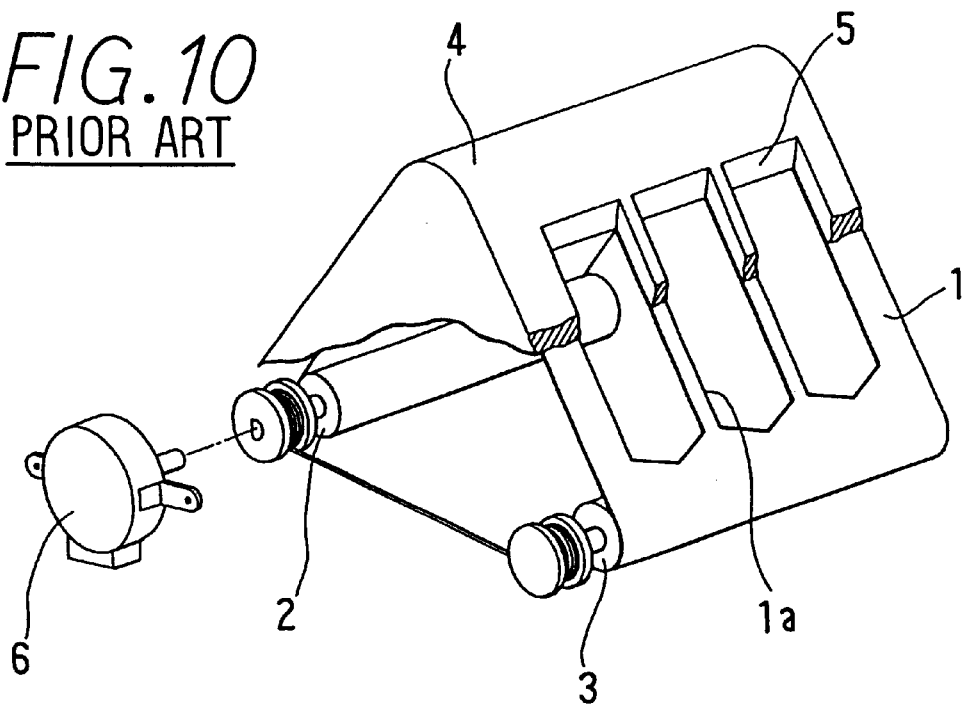
FIG. 10 is a perspective view showing a conventional air passage controlling system.

For example, in the above-described embodiment, the potentiometer 33 is connected to the air outlet mode selecting damper 20 at a side where the DC motor 31 (the driving pulley 27) is disposed; however, the potentiometer 33 may be connected to an air outlet mode selecting damper 51 at a side opposite to a side where the DC motor 31 (the driving pulley 27) is attached, as shown in FIG. 9.

Because a dimension of the multi-rotation type potentiometer 33 is larger than that of a mono-rotation type potentiometer (i.e., single rotation type potentiometer), it may be difficult to dispose both the potentiometer 33 and the DC motor 31 at the same side of the driving shaft 23 in a limited small space. Thus, by providing the potentiometer 33 at the side opposite to a side of the DC motor 31 in an axial direction of the driving shaft 23, the potentiometer 33 and the DC motor 30 can be readily disposed in the air outlet motor selecting damper 51.

Further, the rotation angle of the driving shaft 23 is proportional to the rotation angle of the driven shaft 25, and the potentiometer 33 and the DC motor 31 may be disposed at a distance. Therefore, the potentiometer 33 may be connected to the driven shaft as shown in phantom in FIG. 1. By providing the potentiometer 33 at a side of the driven shaft 25, the potentiometer 33 and the DC motor 30 can be readily disposed in a limited small space.

In the above-described embodiment, the film doors 26 and 40 are moved from a present position to a predetermined position; however, the film doors 26 and 40 may be returned to an original position each time the ignition switch 37 has been turned OFF. In this case, it can be prevented the film doors 26 and 40 from being deformed when a predetermined original position of the film door is set. In the above-described embodiment, the present invention is applied to both the air outlet mode selecting damper 20 and the air mixing damper 16; however, the present invention may be applied to either one of them.

Such changes and modifications are to be understood as being within the scope of the present invention as defined in the appended claims.

What is claimed is:

1. An air passage controlling system comprising:
   a duct for forming an air passage;
   an elongated film member having a film opening and first and second ends in a longitudinal direction thereof, for opening and closing said air passage and for adjusting an amount of air flowing through said air passage;
   first and second shafts for moving said film member therebetween in said air passage;
   an electric motor, connected to a side of said first shaft in an axial direction thereof, for driving said first shaft to move said film member;
   a potentiometer, rotatable in multiple, for detecting a rotation angle of said first shaft;
   a position setting unit for setting a set position of said film door;
   a power transmission unit for transmitting a movement of said first shaft to said second shaft; and
   a control unit for controlling said electric motor in such a manner that said film member is moved according to the rotation angle detected by said potentiometer to be stopped at the set position set by said position setting unit, wherein
   said electrical motor is attached to said first shaft; and
   said potentiometer is attached to said second shaft separated from said first shaft.

2. The air passage controlling system according to claim 1, wherein said potentiometer detects the rotation angle of said first shaft in a range of 0 to 850°.

3. The air passage controlling system according to claim 2, wherein said electric motor is a direct-current motor.

4. The air passage controlling system according to claim 3, wherein:
the set position of said film door, set by said position setting unit, corresponds to a set angle of said first shaft; and
said electric motor is controlled by said control unit to rotate in a forward direction when the set angle of said first shaft is larger than the rotation angle detected by said potentiometer.

5. The air passage controlling system according to claim 4, wherein said electric motor is stopped by said control unit when the rotation angle detected by said potentiometer reaches the set angle of said first shaft.

6. The air passage controlling system according to claim 4, wherein said electric motor is controlled by said control unit to rotate in a reverse direction when the set angle of said first shaft is smaller than the rotation angle detected by said potentiometer.

7. The air passage controlling system according to claim 6, wherein said electric motor is stopped by said control unit when the rotation angle detected by said potentiometer reaches the set angle of said first shaft.

8. The air passage controlling system according to claim 1, wherein said first shaft is directly driven by said electric motor, and said second shaft is driven by said first shaft through said film member.

9. The air passage controlling system according to claim 1, wherein said electric motor is a servomotor.

10. An air conditioning apparatus for a vehicle having a passenger compartment, said apparatus comprising;
a case for forming an air passage, said case having a casing opening through which air is blown toward the passenger compartment;
a heat exchanger, disposed in said case, for adjusting a temperature of air blown toward said casing opening;
a first film member, disposed under tension to be opposite to said casing opening, for opening and closing said casing opening, said first film member having a film opening;
first and second shafts for moving said first film member therebetween in said air passage;
an electric motor, connected to a side of said first shaft in an axial direction thereof, for driving said first shaft to move said film member;
a potentiometer, rotatable in multiple, for detecting a rotation angle of said first shaft;
a position setting unit for setting a set position of said film door,
a power transmission unit for transmitting a movement of said first shaft to said second shaft; and
a control unit for controlling said electric motor in such a manner that said first film member is moved according to the rotation angle detected by said potentiometer to be stopped at the set position set by position setting unit, wherein;
said electric motor is attached to said first shaft; and
said potentiometer is attached to said second shaft separated from said first shaft.

11. The air conditioning apparatus according to claim 10, further comprising:
a second film member, disposed under tension to be opposite to a side surface of said heat exchanger, said first film member having a film opening portion for adjusting an amount of air passing through said heat exchanger.

12. The air conditioning apparatus according to claim 10, wherein said potentiometer detects the rotation angle of said first shaft in a range of 0 to 850°.

13. The air passage controlling system according to claim 1, wherein said electric motor is disposed at an outer side of said first shaft.

14. The air conditioning apparatus according to claim 10, wherein said electric motor is disposed at an outer side said first shaft.

* * * * *